United States Patent

[11] 3,628,863

[72] Inventors Franklin D. Kottler;
Frederick K. Leutung, both of Rochester, N.Y.
[21] Appl. No. 845,350
[22] Filed July 28, 1969
[45] Patented Dec. 21, 1971
[73] Assignee Eastman Kodak Company
Rochester, N.Y.
Continuation-in-part of application Ser. No. 648,264, June 23, 1967, now abandoned. This application July 28, 1969, Ser. No. 845,350

[54] REMOTE FOCUSING OVERRIDE MECHANISM FOR AN AUTOMATIC FOCUSING PHOTOGRAPHIC PROJECTOR
9 Claims, 5 Drawing Figs.

[52] U.S. Cl. ............................................... 353/101
[51] Int. Cl. ............................................... G03b 3/10
[50] Field of Search ......................................... 353/69, 101, 104; 352/140

[56] References Cited
UNITED STATES PATENTS

| 3,249,007 | 5/1966 | Staffer | 353/101 |
| 3,264,935 | 8/1966 | Vose | 352/140 X |
| 3,342,102 | 9/1967 | Maxon | 353/101 X |

*Primary Examiner*—Harry N. Haroian
*Attorneys*—Robert W. Hampton and Steve W. Gremban ABSTRACT: A remote focusing mechanism for a projector for overriding the automatic focusing system which automatically maintains a projected slide image in focus by maintaining a constant focal or spatial distance between a film and a film image projection lens regardless of shifting or displacement of the film along the optical path. In the event the automatic focusing system does not achieve an optimum focused film image, such optimum focused image is achieved by the remote focusing mechanism by disabling the automatic focusing system, arresting movement of the radiation focusing lens, and moving the film image projection lens alone relative to the radiation focusing lens.

FRANKLIN D. KOTTLER
FREDERICK K. LEUTUNG
INVENTORS

ATTORNEYS

FRANKLIN D. KOTTLER
FREDERICK K. LEUTUNG
INVENTORS

BY Steve W. Grambau
Robert W Hampton
ATTORNEYS

FRANKLIN D. KOTTLER
FREDERICK K. LEUTUNG
INVENTORS

BY
ATTORNEYS

REMOTE FOCUSING OVERRIDE MECHANISM FOR AN AUTOMATIC FOCUSING PHOTOGRAPHIC PROJECTOR

This is a continuation-in-part of application Ser. No. 648,264, entitled "Automatic Focusing Photographic Projector Apparatus," filed June 23, 1967 by the same inventors and now abandoned.

CROSS-REFERENCES TO RELATED APPLICATIONS

Reference is made to commonly assigned copending U.S. Pat. application Ser. No. 648,265, entitled "Focus Adjusting Circuitry for a Slide Projector," filed in the name of William E. Jordan and Franklin D. Kottler on June 23, 1967.

BACKGROUND OF THE INVENTION

This invention relates generally to projection apparatus, and more specifically to a remote focusing override mechanism for an automatic focusing projector.

Photographic projectors are known to utilize a source of light energy which, through a condensing lens system, illuminates a photographic slide transparency, the image of which is projected upon a viewing screen through a movable projection lens. In the usual system, the projection lens is displaced along its optic axis relative to the slide to focus the projected slide image onto a viewing screen or surface. It is also well known in the art that the slides undergo physical changes identified as creeping, buckling or popping which displaces or distorts the planar face of the photographic transparency. Some of these spurious conditions are the result of the changing thermal environment experienced by the slide, while others are due to defects in the photographic process or to the somewhat wider processing tolerances permitted by some manufacturers for the cardboard or plastic frame for the transparency. The net result is that the slide is displaced along the optical or projection axis 16 so that steps must be taken to reposition the objective lens 22 to ensure proper focusing. The customary practice is to maintain the screen at a fixed distance, and change the distance from the slide transparency to the lens to accommodate for the aforementioned surface displacement or deformation of the slide transparency.

Various solutions have been proposed for automatically maintaining a projected slide image in proper focus even though the slide surface should move from its focused position for any reason such as "slide popping." For example, U.S. Pat. No. 3,249,001 to Stauffer teaches the utilization of a pair of spaced photoelectric cells which, when the projected slide image is in proper focus, are equally illuminated by the reimage of the reflected radiant energy. As the slide transparency is displaced from its focused position as a result of changes in the slide transparency, it is thus moved along the optical axis with the concomitant effect that the reimage of the reflected radiant energy also moves to illuminate more intensely one of the photoelectric cells. A corrective electrical signal is derived which is a function of this light intensity on the one cell, and a reversible DC motor is energized by this electrical signal to move the slide image projection lens and reposition the reimage of the reflected radiant energy at the null or balance point of the photoelectric cells at which both cells are equally illuminated.

In all of the aforementioned automatic focusing projectors, it is necessary for the operator to initially manually adjust the distance between the film and projection lens to a stable optimum focusing condition in relation to the null point of the photocells. Thereafter, the automatic focusing system automatically maintains the distance between the film and projection lens. In the event the operator desires to operate the projector from a remote position, a problem is presented in those situations where the film image is not in optimum focus during operation of the automatic focusing system. In such cases, the operator must return to the projector and manually focus the film image of the projector to an optimum focusing condition.

SUMMARY OF THE INVENTION

This invention relates to a remote focusing override mechanism for an automatic focusing projector of the type for maintaining a constant focal or spatial distance between a film and an objective or projection lens upon shifting or displacement of the film along the optical path due to popping or the like. The automatic focusing of the projection system to a stable condition in which the film image is in focus is achieved by simultaneously moving the projection lens and a radiation focusing lens of a film scanning means that continuously projects or images a radiation source on the film. In situations in which the film image is not properly focused when the projection system is in its stable condition under automatic focusing control, a remote focusing mechanism is provided to override the automatic focusing system and achieve an optimum focusing condition by disabling the automatic focusing system, arresting movement of the radiation focusing lens in the stable condition, and moving the film image projection lens alone relative to the radiation focusing lens.

Accordingly, it is an object of this invention to provide an automatic focusing photographic projector apparatus with a remote focusing override capable of remotely focusing the projector to achieve an optimum focusing condition in the event the film image is not properly focused in its stable automatically focused condition.

Another object of the invention is to provide a remote focusing mechanism for overriding the automatic focusing system to achieve an optimum focusing condition by disabling the automatic focusing system, arresting movement of the radiation focusing lens of the focusing system in the stable focused condition, and then moving the film image projection lens alone relative to the radiation focusing lens.

The novel features which are believed to be characteristic of the invention are set forth with particularity in the appended claims. The invention itself, however, both as to its organization and method of operation together with further objects and advantages thereof, may best be understood by reference to the description to follow taken in connection with the accompanying drawings.

DESCRIPTION OF THE PREFERRED EMBODIMENT

Figure 1:
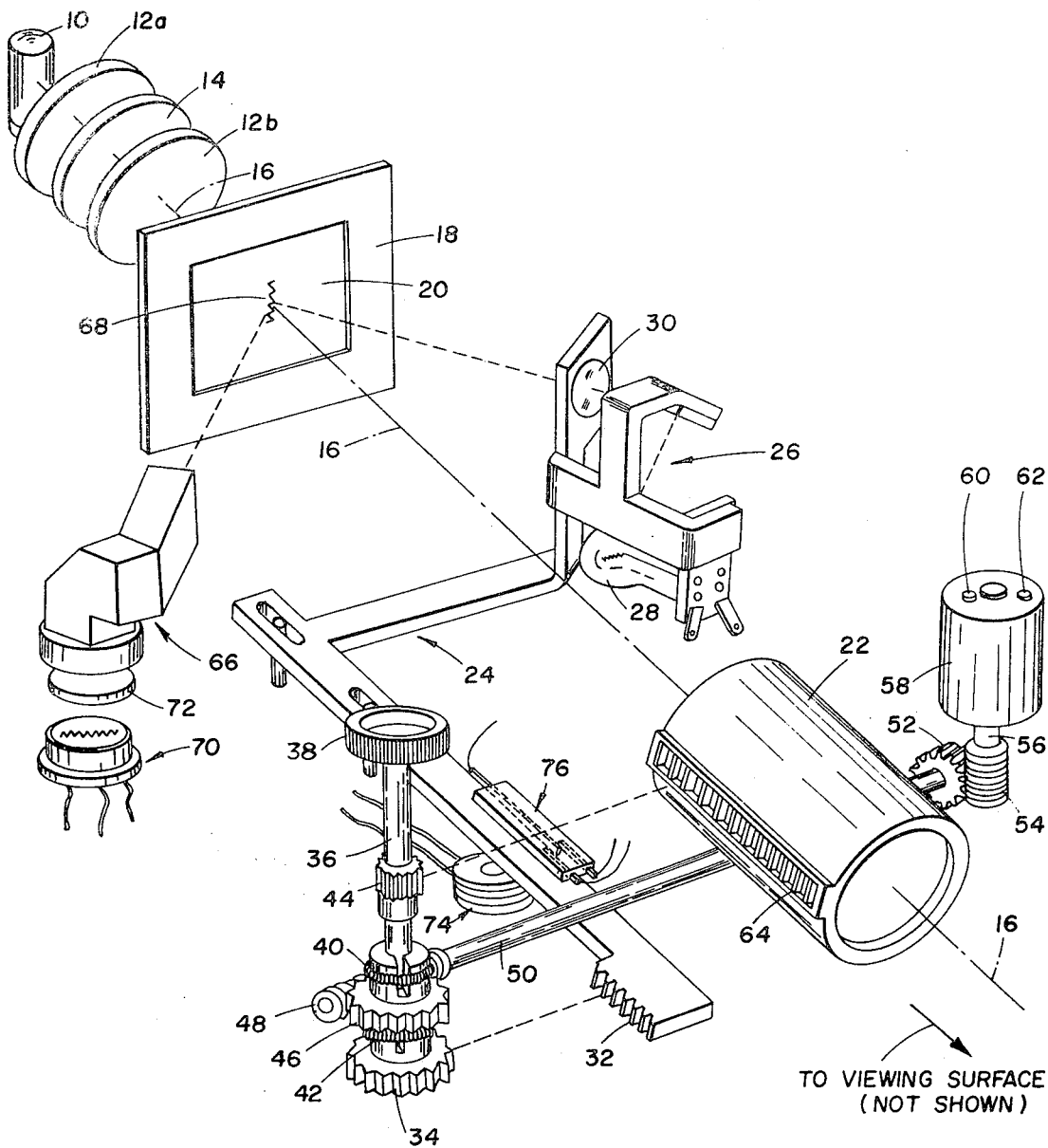
FIG. 1 is a diagrammatic view in perspective and partly in exploded form showing the remote override mechanism of this invention in relation to an automatic focusing projector.

Referring now to FIG. 1, reference numeral 10 designates a lamp with a proximity reflector for transmitting a light beam through condensing lenses 12a and 12b, and through a filter 14 along the optical or projection axis 16 of the photographic projector. The purpose of the filter 14 is to eliminate as much of the infrared rays as possible, these latter rays producing heat which has deleterious effects on the photographic transparency.

The slide to be projected comprises a slide mount or frame 18 and a photographic film transparency 20, suitably supported by appropriate holding means so that the intelligence or film image on the transparency 20 will be projected by the projection or objective lens indicated at 22, along the optical axis 16 to a viewing surface or screen, not shown.

A support member means indicated generally at 24, has integrally mounted therewith a radiation means, indicated generally at 26, for projecting radiation on the film 20, and comprises a pilot lamp 28, a lamp filament focusing lens 30 and a mirror (not shown on the drawing in the interests of clarity), the mirror merely serving to reflect the light from pilot lamp 28 to the lens 30.

The support member 24 includes a rack 32 which is arranged to operatively engage pinion 34 on a focus shaft 36. A knob 38 is secured to one end of focusing shaft 36 for manually providing rotational displacement to the shaft 36.

The focusing shaft 36 also includes coaxially mounted slip clutches 40, 42 of known type such as continuous helical springs associated with gears 46, 34 respectively. The gear 46 on focusing shaft 36 engages worm 48 which is mounted on transmitting shaft 50. At the other end of transmitting shaft 50, a gear 52 is arranged to operatively engage a worm 54 suitably mounted on the drive shaft 56 of a DC reversible motor 58 having input terminals indicated at 60, 62.

The film image projection lens mount and lens 22 includes a rack 64 arranged on its outer housing for cooperative engagement with pinion 44 on focusing shaft 36, so that the projection lens may be axially displaced along the optical axis 16 to focus the film image on film or transparency 20 onto a screen, not shown.

An optical means, indicated generally at 66 is arranged in proximity to the slide so as to project the image 68 of the filament of lamp 28 reflected from film 20 in focus onto a photoconductive transducer or sensing means indicated generally at 70. The particular arrangement of optical means 66 is a matter of design consideration, and in the embodiment shown in FIG. 1 includes a lens and two mirrors, not shown.

Figure 3:
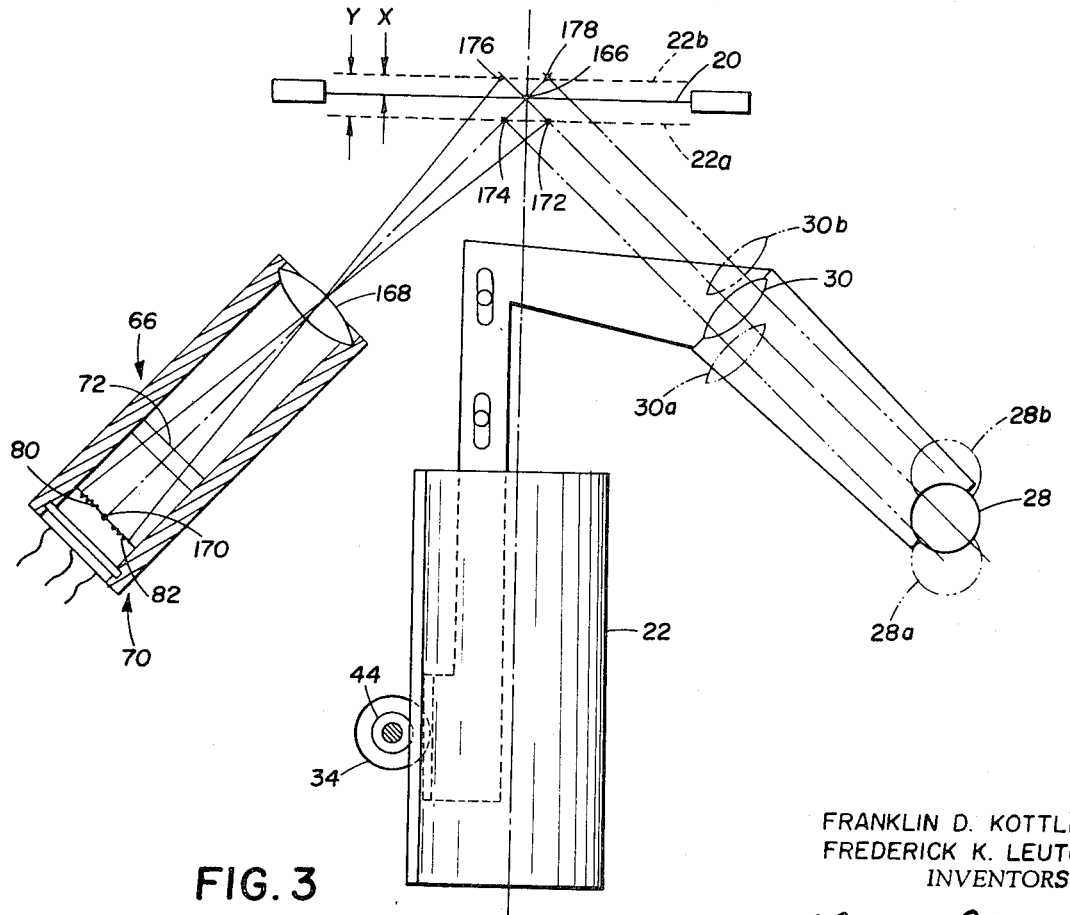
FIG. 3 is a schematic view of a portion of the automatic focusing mechanism showing the relative movement required of the radiation focusing means and the slide transparency to achieve proper focusing.

In the interests of clarity, the optical means 66 is indicated schematically in FIG. 3 with only the principal functional elements shown to enable an understanding of the invention. The light reflected from image 68 on the front surface of the film transparency 20 may be reflected by any suitable lens 168 through a filter 72 to the photoconductive transducer means 70.

Depending upon the sensing or transducer means 70 selected, the sensitivity of the transducer's performance may be increased by selecting an infrared type filter positioned in the path of the reflected radiant energy from image 68; this type filter passes only infrared radiation while substantially blocking the visible portion of the spectrum. This arrangement has the dual advantage of (a) reducing the possibility of spurious response, and (b) increasing the sensitivity of the transducer means 70. In the practical embodiment described herein, the photoconductive transducer means is of the cadmium selenide type.

Clamping or arresting means are indicated generally at 74 (see FIGS. 1 and 2), and switch means are indicated generally at 76. In the embodiment shown in FIG. 1, the clamping means is illustrated as an electromagnet 74, although a solenoid may also be used to advantage; similarly the switch means is here illustrated as a magnetic reed switch of the single-pole, double-throw type, having one contact normally closed, although a microswitch may also be utilized. When electromagnet 74 is energized through switch 76, it magnetically attracts an arm of support member 24 and prevents or arrests movement of the member 24.

Figure 4:
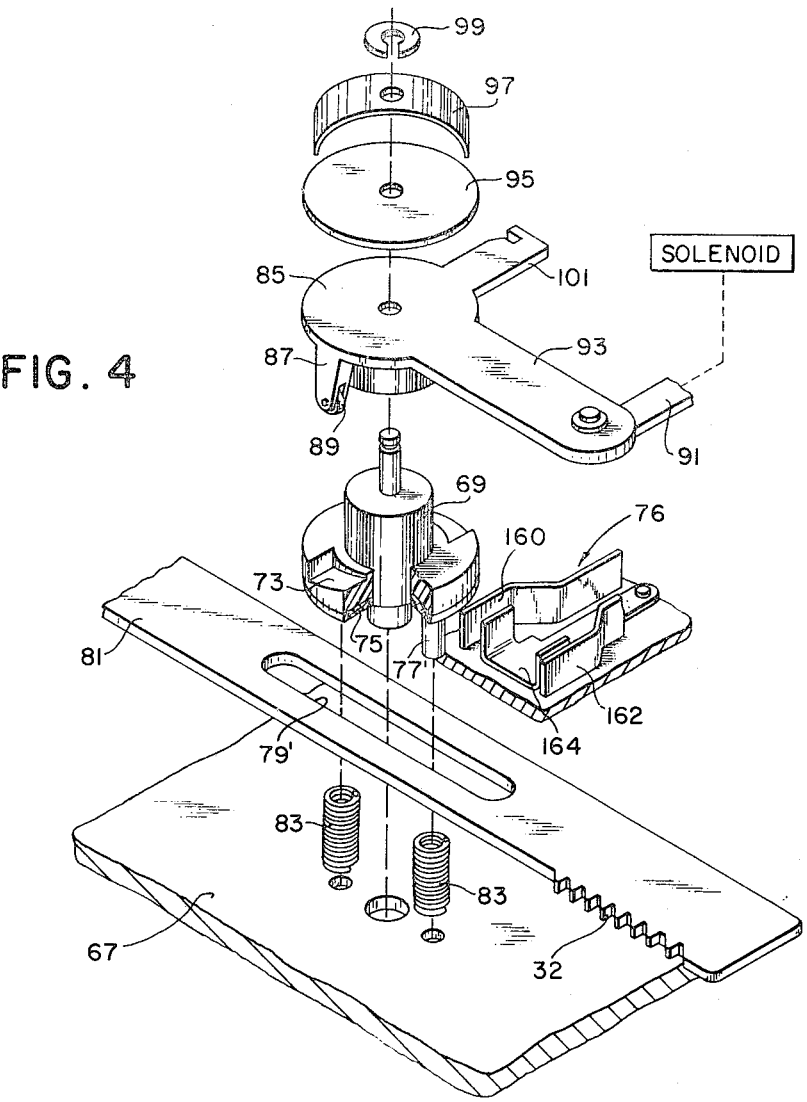
FIG. 4 is an exploded view in perspective of another embodiment of the clamping or arresting means of FIG. 1.
Figure 5:
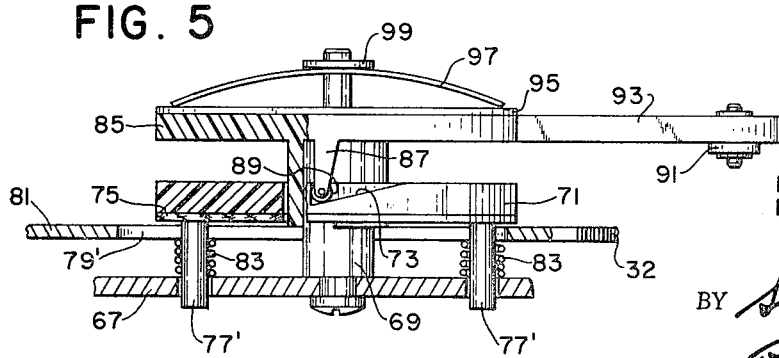
FIG. 5 is a side elevational view of the clamping or arresting means of FIG. 4 in an assembled position.

An improved embodiment of the clamping or arresting means is shown in FIGS. 4 and 5. In describing this embodiment, projector parts similar to parts disclosed in FIGS. 1-3 will be denoted by the same numerals. In this arresting means, a support plate 67 is provided to which a cylindrical member 69 is secured. An annular cam follower member 71 having cam follower surfaces 73 is secured to or integrally formed with member 69. Cam follower member 71 has a brake lining 75 and a pair of laterally extending posts 77' extending through an elongated slot 79' in an arm 81 of support member 24, and through openings in plate 67. Springs 83 encircle posts 77' and are interposed between plate 67 and arm 81. The brake lining 75 of cam member 71 is urged into braking engagement with arm 81 by a generally circular cam member 85 rotatably mounted on one end of cylindrical member 69 and having diametrically opposed laterally extending arms 87, only one of which is visible in FIGS. 4 and 5. Each arm 87 has a cam roller 89 rotatably secured to the ends thereof and positioned in engagement with a corresponding cam follower surface 73. Pivotal movement of cam member 85 by energization of a solenoid connected to a lever 91, which in turn is pivotally secured to an arm 93 of member 85, causes rollers 89 to move along cam follower surfaces 73 and urge cam member 71 and brake lining 75 into braking engagement with arm 81. Cam member 85 is retained on member 69 by a washer 95, spring 97 and lock ring 99, and further has a switch arm 101 connected to a movable switch contact 164 (see FIG. 2) for moving switch 76 between a normal automatic focusing position and a remote focusing position. In the normal automatic focusing position of switch 76, contact 164 engages contact 162 for electrically connecting transducer 70 to focus motor 58. In the remote focusing position of switch 76, contact 164 is moved away from contact 162 and into engagement with contact 160 for electrically connecting the remote focus switch 144 to focus motor 58.

Figure 2:
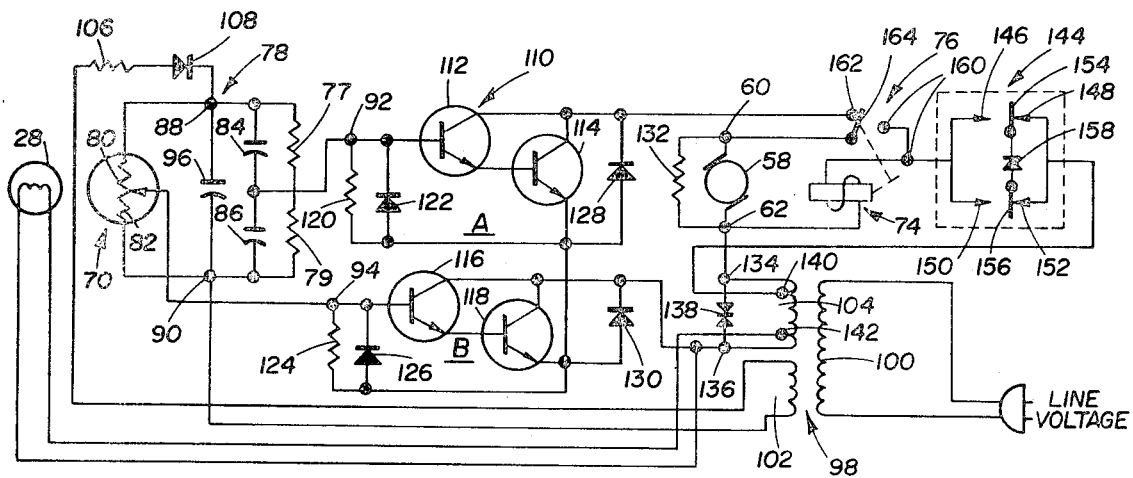
FIG. 2 is an electrical circuit diagram showing the automatic and remote focusing circuitry.

A remote focusing control means for actuating the mechanism of FIG. 1 separately from the automatic focusing achieved by projecting means 26 and transducer 70 is depicted in the electrical circuitry of FIG. 2. This circuitry is separately described and claimed in U.S. Pat. No. 3,466,125 in the names of William E. Jordan and Franklin D. Kottler. The circuitry of FIG. 2 provides the signals for actuating the DC reversible motor 58. A bridge circuit indicated generally at 78, comprises resistors 77, 79 arranged to form two arms of the bridge, while the photoconductive transducer means 70 is electrically arranged to provide the other two resistive arms indicated at 80, 82 respectively. Resistor 77 and 79 are shunted by capacitor 84, 86 respectively. The input terminals of the bridge circuit are indicated at 88, 90, the output being taken at terminals 92, 94 respectively. A capacitor 96 is connected between input terminals 88, 90 as shown.

An isolation transformer, indicated generally at 98 comprises primary 100 and secondaries 102, 104. The secondary winding 102 energizes the bridge circuit 78 through a rectifying means comprising resistor 106, and diode 108 to provide rectified AC to energize the bridge circuit 78, the resistor-diode series combination 106, 108 being connected one side of secondary 102 as shown.

The output at 92, 94 of the bridge circuit 78 is applied to a transistor network indicated generally at 110; this latter network is intended to provide corrective signals for counterclockwise (CCW) and clockwise (CW) rotation of reversible DC motor 58. For discussion purposes only these channels have arbitrarily been identified as channel A for CW rotation and channel B for CCW rotation.

The transistor network 110 comprises NPN-transistors 112, 114, 116 and 118 each having a base, a collector and an emitter as indicated by the conventional symbols in the drawings. The transistors 112, 114 (forming in part the signal path for the CW Channel A) are connected in amplifying cascade, the collectors being electrically common, and the emitter of transistor 112 being connected to the base of transistor 114. Similarly, transistors 116, 118 (forming in part the signal path for the CCW Channel B) are arranged in amplifying cascade, the respective collectors being electrically connected in common, and the emitter of transistor 116 is connected to the base of transistor 118. Also the emitter of transistors 114 and 118 are electrically common.

The CW Channel A is connected to the output terminal 92 of the bridge circuit 78, at the base of transistor 112. Similarly CCW Channel B is connected to the output terminal 94 at the base of transistor 116.

Resistor 120 is connected in parallel with diode 122, the parallel combination being electrically connected between the base of transistor 112, and the emitter of transistor 114.

Similarly, resistor 124 in parallel with diode 126, is connected between the base of transistor 116 and the emitter of transistor 118.

A diode 128 is connected with its cathode to the collector of transistor 114, and its anode to the emitter of transistor 114. In similar manner, the diode 130 is connected with its cathode to the collector of transistor 118 and its anode to the emitter of transistor 118.

The DC reversible motor terminals 60, 62 are shunted by resistor 132.

The transformer secondary 104 has output terminals indicated at 134, 136 across which a diode transient voltage suppressor 138 is connected. The secondary 104 also has taps identified at 140, 142. Heater current for the filament of lamp 28 is provided across tap 142 and terminal 136 of secondary 104 as indicated.

A remote focusing switch indicated generally at 144 is shown in FIG. 2 in the normal automatic focusing or rest position. This switch comprises four contacts 146, 148, 150 and 152. Blade elements are indicated at 154 and 156, the anchor or hinge ends (unnumbered) of the blade elements 154, 156 being connected in circuit with diode 158. Contacts 148 and 152 are connected in common, and to the tap 140 on the secondary 104 of transformer 100. Contacts 146 and 150 are connected in common, and to contact 160 of magnetic reed switch 76 (for convenience in FIG. 2 the contact 160 has been shown separated, but in the practical embodiment these contacts are physically and electrically one).

The clamping means 74, shown in FIG. 1 as an electromagnet, has one end of its coil connected to contact 160 of magnetic reed switch 76, the other end of the coil being connected to input terminal 62 of reversible DC motor 58.

OPERATION

The practice of the invention can best be appreciated by considering a step-by-step approach by the operator to place the photographic projector apparatus in optimum condition for viewing; reference will accordingly be made to FIGS. 1, 2 and 3. The apparatus is appropriately energized and a slide is placed in position in any convenient manner. The manual knob 38 (FIG. 1) is then rotated to move the objective lens 22 the proper distance toward or away from a side transparency to focus the slide image projected on a viewing screen which is set up at any convenient distance from the projector. Rotary displacement of the manual knob 38 causes the objective lens 22 to be axially displaced by means of pinion 44 which engages rack 64 on the objective lens 22, the slip clutch 40 providing selective disengagement which prevents the rotary displacement of focus shaft 36 from being transmitted to the support member 24 to disturb the setting between the radiation focusing lens 30 of the radiation means 26 and the slide.

The automatic focusing of FIG. 2 provides a means whereby automatic focusing is obtained regardless of any changes in the face of the transparency 20. An image of the filament of lamp 28 (FIG. 1) is formed on the front surface of the transparency 20, the image appearing as 68 on surface 20. The image 68 is projected through the optical means 66, through the filter 72, to the photoconductive transducer means 70. The photoconductive transducer 70 is a unit in which the electrical resistance decreases as light falls on the exposed surface. Various materials may be used in this type of cell, among those being selenium, germanium, thallous sulfide, lead sulfide, silicon, and cadmium sulfide. These materials respond to light in the visible spectrum as well as to other wavelengths in the spectrum, such as infrared and ultraviolet. In this embodiment of the invention, transducer 70 is of the cadmium selenide type. The filter 72 is selected so that the transducer 70 will be particularly sensitive in the infrared region.

In order to appreciate what happens at the plane of the transparency, the photographic transparency 20 is shown in its normal position by heavy lines in FIG. 3. When the slide is cool, the light from lamp 28 is projected through lens 30 to the point 166 on the transparency 20. From here the light is transmitted through a lens 168 of the optical means 66 to the point 170 on the photoconductive transducer 70. This is the nominal position, and the effect is to electrically produce equal resistance magnitudes for resistors 80, 82 (FIG. 2). Let us assume now that some condition occurs which causes the transparency 20 to be displaced to the position indicated at 22a. In this particular situation the light from the lamp 28 is focused through lens 30 to the point 172 which, as indicated by the principal light ray, passes through the lens 168 through filter 72 to the surface of the transducer 70 which comprises resistor 80. As may be seen from FIG. 3, the resistor 80 now receives more light than the surface comprising resistor 82, causing the resistor 80 to become lower in electrical resistance. In order to accommodate for this spurious condition of the transparency, it is necessary for the lamp 28 and lens 30 to move to a new position 28a, 30a, respectively so that the image 68 is now focused on point 174 to produce a null condition on the photoconductive transducer 70. Similarly, if the slide were deformed to the position 22b, the filament image 68 would be focused at point 176 resulting in light falling on surface comprising resistor 82. To return the system to the null position, it would be necessary then for the lamp and lens to move to the position indicated as 28b, 30b, and in the new position, the image 68 would be focused on point 178 to provide the desired null.

As will be noted from a study of FIG. 3, for any transparency displacement X, the lamp 28 must move a distance Y which equals 2X measured normal or perpendicular to the transparency 20. Since the lamp 28 and the support member 24 must move twice the distance that the slide is moved, gears 34 and 44 are in the ratio of 2:1 and therefore the projection lens 22 moves the same distance as the slide.

The resistive changes produced in the photoconductive transducer means 70 are converted into error signals by the circuitry of FIG. 2. In the discussion which follows all references will be to conventional current flow. When the light from a slide is in the null position, falling at point 170 of the transducer 70, the bridge circuit 78 is electrically in balance. The output of the bridge circuit 78 may be conveniently considered to be at terminals 92, 94, respectively. When the bridge circuit 78 is in balance, transistors 112, 116 are cut off. Transistor 112 is cut off, and since the base of transistor 114 is connected to the emitter of transistor 112, transistor 114 is also cut off. In a similar manner, transistor 116 is cut off, and it insures that transistor 118 is also cut off.

Arbitrarily, let us assume that the condition shown at 22a of FIG. 3 obtains, the light falling on the surface identified as resistor 80. As a result there is a decrease in resistance 80, so that the voltage will rise at terminal 94. (Terminal 94 is electrically the same as the connection between resistors 80 and 82). The base-emitter junction of transistor 116 is now forwardly biased and emitter current flows; when transistor 116 turns on, it turns on transistor 118.

It will be helpful to trace the main current flow in channel B. Since there is alternating current across secondary 104, terminals 134, 136 are alternately + and −. We shall assume the condition where terminal 136 is instantaneously positive.

When the voltage rises at terminal 94, current flows through the base-emitter junction of transistor 116, through the base-emitter of transistor 118, through the resistor diode combination 120, 122 to the other output terminal 92 of the bridge circuit 78. Collector current of course also flows in transistor 116.

When base current flows in transistor 118, collector current flows and may be traced from terminal 136 (which is considered at the moment to be +), through the collector-emitter junction of transistor 118, through diode 128, through 162, 164 of magnetic reed switch 76, into motor terminal 60, and out of motor terminal 62 to terminal 134 (which we have assumed to be minus). Motor 58 is now energized and it rotates in counterclockwise direction.

As the motor 58 turns, rotary displacement of its drive shaft 56 is transmitted through worm 54, gear 52, worm 48, gear 46, gear 34, and rack 32 to move the support member 24 until the lamp and lens have the position 28a, 30a respectively as indicated in FIG. 3.

In a similar manner, should a slide be displaced to the condition indicated at 22b, FIG. 3, the light falling on the surface identified as resistor 82 will cause its magnitude to decrease. As a result the voltage at the point joining resistors 80, 82 will fall, and the bridge unbalanced condition will force conventional current out of terminal 92, through the base-emitter junction of transistor 112, through the base-emitter junction of transistor 114, through the resistor 124 and diode 126 in parallel, to the bridge output terminal 94.

We shall now assume that 134 of secondary 104 is positive. When emitter current flows in transistor 114, it causes collector current to flow in a path which may be traced from terminal 134, through motor terminals 62, 60, through 162, 164 of magnetic reed switch 76, the collector-emitter junction of transistor 114, through diode 130 to terminal 136 which is now negative for the case we have assumed.

The rotary displacement of the motor shaft is transmitted as before, only now in the opposite direction (CW), to the rack 32 to displace the support member 24 until the lamp and lens have the position 28b, 30b respectively as indicated in FIG. 3.

The remote focus switch 144 may be used to advantage to (a) set the initial focus on the first slide, and (b) make small corrections in focus where glass mounted slides are used since the automatic focusing system has some difficulty in locating the film through the glass material.

The remote switch 144 may be manually depressed to provide two electrical conditions:

a. blade element 154 closed to contact 146 (CCW rotation), and
b. blade 156 closed to contact 150 (CW rotation).

Assume that switch 144 is depressed to move element 154 in contact with 146. Taps 134, 140 of secondary 104 are alternating between + and −, but assume the condition where tap 140 is instantaneously +. Current may be traced from tap 140, through diode 158, through 146, 154, through electromagnet 74, to terminals 134–62 (electrically common). The energization of electromagnet 74 pulls reed element 164 to contact 160, and therefore current also flows through contact 160 and into the motor terminal 60 causing the motor to rotate in a counterclockwise direction.

The energization of electromagnet 74 of FIG. 1 or the solenoid of FIG. 4 also serves to clamp or arrest the support member 24 (FIG. 1) so that it cannot be displaced. Thus the focus between the slide and the pilot image projecting means 22 will not be disturbed, and the slide image projection lens 22 may be moved with respect to the screen without moving support member 24 and projecting lens 22. The rotary motion of the motor 58 is transmitted through worm 54, gear 52, worm 48, gear 46, gear 44 and to the rack 64 on the housing of the projection lens 22. Due to slip clutch 42 which permits slippage between shaft 36 and gear 34 at a force less than the clamping force of the arresting means, gear 34 is held by support member 24 and rack 32 as shaft 36 rotates.

The clockwise (CW) rotation for the motor 58 is accomplished by closing blade element 156 to contact 150. Assume that terminal 134 of secondary 104 is instantaneously +. The current may be traced from terminal 134, through the terminal 62, through the coil of electromagnet 74, through 150, 156, through diode 158 to return to negative tap 140. When the electromagnet is energized, it closes the reed 164 to contact 160, and the circuit for the motor may be traced from terminal 134, through the motor 164, 160, contact 150, blade element 156, and diode 158 to return to the negative tap 140 of secondary 104.

The operator may thus selectively energize the electric motor 58 so as to move the objective lens toward or away from the viewing screen, while at the same time the radiation focusing lens is held fixed.

The capacitors 84, 86 provide two useful functions for the circuitry: (a) insuring high initial current output for the bridge and (b) anticipating the null position and preventing hunting of the motor 58. In order to more fully appreciate the dual roles played by the capacitors, assume for discussion that the bridge circuit 78 is supplied with a voltage in the order of magnitude of 40 volts. The capacitors 84, 86 will therefore each be charged to approximately 20 volts. The bridge current output is a function of the change in current brought about by the light beam falling upon the surfaces of either resistor 80 or resistor 82 respectfully, plus the transient capacitor current. As is well known, since the voltage across a capacitor cannot change instantly, the initial electrical disturbance to the bridge produces an initial surge current which is large, and which is transmitted to either of the output terminals 92 or 94, where it is amplified by the transistor network of channels A or B, and is immediately applied to the input terminals of motor 58. This has the advantageous effect of overcoming the inertia of the motor, and starting it rotating in a direction to correct the condition. As the transient situation continues, the bridge current begins to fall off, so that DC pulses of decreasing magnitudes are applied to the motor 58. Concurrently, the capacitors 84, 86 are charging to a potential somewhat higher than the initial 20 volts, and the higher charged capacitors then attempt to send current through the bridge circuit 78 in the opposite direction. This is tantamount to anticipating that the null position will soon be reached by the light beam. As the output bridge current goes through zero, some small current is actually forced in the opposite direction. Although it is of small amplitude, the net result is that pulses of opposite polarity and small amplitude are then applied to the motor 58. This has a braking effect on the rotation of the motor and derivatively has the effect of anticipating the null position of the light beam, and preventing hunting by the motor 58.

The invention has been described in detail with particular reference to preferred embodiments thereof, but it will be understood that variations and modifications can be effected within the spirit and scope of the invention.

We claim:

1. In a projector having a housing, an illuminated optical axis, means for supporting film transparencies along said optical axis, a support member mounted on said housing for movement in a direction parallel to said optical axis, automatic focusing means for sensing the distance along said optical axis between a supported film transparency and said support member and for generating an error signal indicative of any variation of said distance from a predetermined reference distance, and a projection lens adjustably mounted on said support member for movement therewith along said optical axis; the improvement comprising:

a single drive member engageable to move said projection lens along said optical axis;
  means for frictionally coupling said drive means to said support member to move said support member in a direction parallel to said optical axis;
  means selectively actuatable for preventing movement of said support member;
  means responsive to an error signal from said automatic focusing means for energizing said drive member; and
  means for disabling said energizing means when said means for preventing movement of said support member is actuated.

2. The improvement as defined in claim 1 wherein said means for preventing movement of said support member comprises a mechanism for engaging said support member to prevent movement thereof by said drive member.

3. The improvement as defined in claim 2 wherein said mechanism comprises an electromagnet.

4. The improvement as defined in claim 2 wherein said mechanism comprises:
  a brake disc;
  a solenoid; and Cam means interposed between said brake disc and said solenoid and responsive to energization of said solenoid to move said brake disc into braking engagement with said support member.

5. In film image projection apparatus for automatically maintaining a predetermined distance between a film which is capable of displacement along the optical axis of the apparatus and a projection lens, the combination comprising:

film scanning means including movable optical means and a radiation source for projecting radiation onto the film;

means responsive to reflected radiation from the film for sensing variations in the distance between the film and the projection lens from a predetermined distance resulting from film displacement along the optical axis and for generating an output signal corresponding to the film displacement;

drive means coupled to said movable optical means and the projection lens and responsive to said output signal for moving both said optical means and said projection lens to restore the distance between the film image and the projection lens to said predetermined distance;

control means for operating said drive means; and means responsive to said control means for disabling said sensing means, arresting movement of said optical means, and operating said drive means for moving only said projection lens independently of said movable optical means to adjust said predetermined distance to place the projected film image in optimum focus.

6. In apparatus for automatically focusing the projected film image of a projector to compensate for film displacement from a film plane during projection wherein the film image is illuminated by a light source and is projected by a projection lens displaced a predetermined distance from the film onto a viewing plane, the combination comprising:

radiation means for scanning the film and including movable optical means for directing radiation onto the film;

means responsive to the radiation reflected from the film for sensing variations in the distance between said lens and said film plane from the predetermined distance resulting from film displacement from said film plane and for generating an output signal corresponding to the film displacement, said sensing means having a null condition in which said output signal is at a predetermined magnitude and the distance between said film image and said projection lens is maintained at said predetermined distance;

automatic means responsive to said output signal of said sensing means when film displacement occurs for simultaneously moving both said projection lens and said optical means until said sensing means returns to its null condition; and means for disabling sensing means, arresting said automatic means, and moving only said projection lens to focus the film image on the viewing plane in those situations where the film image is out of focus in the null condition of said sensing means.

7. In a photographic projector having means for holding a film containing an image area in a film plane, said film being capable of shifting out of coincidence with said film plane, a light source for illuminating the image area of said film, and a projection lens positioned a predetermined distance from said image area for projecting the image area onto a screen or the like, the combination comprising:

a radiation source;

first means movably mounted adjacent said radiation source, said first means including optical means to form an image of said radiation source on the film;

sensing means for generating an output signal in response to radiation;

second means to reimage the reflected image of said radiation source from the film onto said sensing means, said sensing means generating said output as a function of the position of the reimage thereon and having a minimum output at a null position of the reimage at which the distance between the film and said projection lens is the predetermined distance;

third means responsive to said output from said sensing means when the film is shifted and the position of the reimage is altered from its null position to move both said projection lens and said optical means until the reimage is restored to its null position;

control means for operating said third means; and means responsive to said control means for in timed relation (1) disabling said sensing means, (2) arresting movement of said optical means in the position assumed by said optical means when said sensing means is in said null condition, and (3) moving only said projection lens to adjust the predetermined distance and to place the projected image area in optimum focus.

8. The invention according to claim 7 wherein:

said first means comprises a movable member;

said third means comprises a motor and means drivingly connecting said motor to said movable member and to said projection lens; and said disabling, arresting and operating means comprises a mechanism for engaging said movable member to prevent movement thereof by said motor.

9. In a projector having a housing, an illuminated optical axis, means for supporting film transparencies along said optical axis, a support member mounted on said housing for movement in a direction parallel to said optical axis, automatic focusing means for sensing the distance along said optical axis between a supported film transparency and said support member and for generating an error signal indicative of any variation of said distance from a predetermined reference distance, and a projection lens adjustably mounted on said support member for movement therewith along said optical axis; the improvement comprising:

coupling means actuable to a first condition for drivingly connecting said drive member to said support member and said projection lens for moving both said support member and said projection lens in unison and to a second condition for drivingly connecting said drive member to said projection lens for moving said projection lens relative to said support member;

means responsive to an error signal from said automatic focusing means for energizing said drive member when said coupling means is in said first condition; and separate means for energizing said drive member when said coupling means is in said second condition.

* * * * *